United States Patent [19]

DiGiovanni et al.

[11] Patent Number: 5,406,404
[45] Date of Patent: Apr. 11, 1995

[54] METHOD OF MITIGATING GAIN PEAKING USING A CHAIN OF FIBER AMPLIFIERS

[75] Inventors: David J. DiGiovanni, Montclair; Jonathan A. Nagel, Freehold, both of N.J.; Richard G. Smart, Naperville, Ill.; James W. Sulhoff, Ocean; John L. Zyskind, Shrewsbury, both of N.J.

[73] Assignee: AT&T Corp., Murray Hill, N.J.

[21] Appl. No.: 146,340

[22] Filed: Nov. 2, 1993

[51] Int. Cl.⁶ .............................................. H04B 10/00
[52] U.S. Cl. ................................... 359/161; 359/160; 359/173; 359/179; 359/341; 359/134; 372/6
[58] Field of Search ........ 359/124, 126, 134, 160-161, 359/173, 188, 179, 341; 372/6

[56] References Cited

U.S. PATENT DOCUMENTS

| | | | |
|---|---|---|---|
| 5,050,949 | 9/1991 | DiGiovanni et al. | 359/341 |
| 5,117,303 | 5/1992 | Desurvire et al. | 359/341 |
| 5,271,024 | 12/1993 | Huber | 359/341 |
| 5,276,543 | 1/1994 | Olshansky | 359/124 |
| 5,317,660 | 5/1994 | Veith | 319/341 |

OTHER PUBLICATIONS

J. A. Nagel, S. M. Bahsoun, D. A. Fishman, D. R. Zimmerman, J. J. Thomas and J. F. Gallagher, "Optical Amplifier System Design and Field Trial", Technical Digest of OSA Topical Meeting on Optical Amplifiers and their Applications, Sante Fe, Jun. 1992, pp. 76–82.

K. Inoue, T. Kominato and H. Toba, "Tunable Gain Equalization using a Mach Zehnder Optical Filter in Multistate Fiber Amplifiers", IEEE Photonics Technology Letters, vol. 3, 1991, pp. 718–720.

A. R. Chraplyvy, J. A. Nagel and R. W. Tkach, "Equalization in Amplified WDM Lightwave Transmission Systems", IEEE Photonics Technology Letters, vol. 4, 1992, pp. 920–922.

E. Goldstein, V. da Silva, L. Eskilden, M. Andrejco and Y. Silberberg, "Inhomogeneously Broadened Fiber-Amplifier Cascade for Wavelength-Multiplexed Systems", IEEE Photonics Technology Letters, vol. 5, 1993, pp. 543–545.

*Primary Examiner*—Herbert Goldstein
*Assistant Examiner*—Kinfe-Michael Negash

[57] ABSTRACT

The present invention relates to a method of mitigating gain peaking in a chain of fiber amplifiers by pumping the amplifiers at a predetermined wavelength to produce gain over a specified wavelength range.

11 Claims, 3 Drawing Sheets

METHOD OF MITIGATING GAIN PEAKING USING A CHAIN OF FIBER AMPLIFIERS

BACKGROUND OF THE INVENTION

1. Field of The Invention

The present invention is directed to a method of mitigating gain peaking in optically amplified systems having application in long-haul transmission systems, networks and other optical communication systems. Specifically, the present invention is directed to maintaining adequate signal-to-noise ratio (SNR) and gain over a range of wavelengths, mainly those in which wavelength-multiplexed (WDM) optically amplified channels will be present. The method of the present invention achieves the desired results by using a chain of fiber amplifiers and pumping them at a predetermined wavelength to produce gain over a specified wavelength range covering the range of likely channels for WDM systems.

2. Prior Art Statement

There is considerable interest in using dense wavelength division multiplexing (DWDM) and optical amplification (Nagel et al.) in optical networks, both for enhancing the capacity of existing long-haul optical networks or for achieving high capacity in future local area networks. One area of great concern is ensuring that, in systems containing concatenated chains of optical amplifiers, an adequate optical signal-to-noise ratio (SNR) is maintained over the range of wavelengths that the WDM channels will occupy. The problems of gain and/or SNR equalization have received considerable attention. K. Inoue, T. Kominato and H. Toba, "Tunable Gain Equalization using a Mach Zehnder Optical Filter in Multistage Fiber Amplifiers", IEEE Photonics Technology Letters, Vol. 3, 1991, pp. 718–720, have approached the problem by using Fabry-Perot and Mach-Zehnder filters. A more useful and simpler technique of adjusting the power in each channel at the transmitters using information conveyed via telemetry was utilized by A. R. Chraplyvy, J. A. Nagel and R. W. Tkach, "Equalization in Amplified WDM Lightwave Transmission Systems", IEEE Photonics Technology Letters, Vol. 4, 1992, pp 920–922. While this technique works, it would clearly be preferable if it was unnecessary. It has recently been shown by E. Goldstein, V. daSilva, L. Eskilden, M. Andrejco and Y. Silberberg, "Inhomogeneously Broadened Fiber-Amplifier Cascade for Wavelength-Multiplexed Systems", IEEE Photonics Technology Letters, Vol. 5, 1993, pp. 543–545, that a chain of amplifiers will produce a flatter gain profile if they are inhomogeneously broadened. However, this requires cooling the erbium-doped fibers to low temperatures. These studies have all dealt with erbium-doped fiber amplifiers pumped at a wavelength of 1480 nm. Therefore, the prior art does not disclose a method for mitigating gain peaking by providing a chain of fiber amplifiers and pumping the amplifiers at a predetermined wavelength, preferably at a wavelength less than 1400 nm, to achieve gain over a specified wavelength range.

SUMMARY OF THE INVENTION

The present invention relates to a method of mitigating gain peaking by providing a chain of fiber amplifiers and pumping the amplifiers at a predetermined wavelength to produce gain over a specified wavelength range. In order to test the effectiveness of the proposed invention, an experiment mimicking the parameters of a long-haul system was conducted. This experiment involved the use of a chain of four erbium-doped fiber amplifiers (EDFAs) pumped at a wavelength of 980 nm to produce gain over a wavelength range of 1540 nm–1562 nm.

BRIEF DESCRIPTION OF THE DRAWINGS

The present invention described in the specification herein will be more fully understood when taken in conjunction with the drawings appended hereto, which show as follows.

DETAILED DESCRIPTION OF THE DRAWINGS

The present invention relates to a method of mitigating gain peaking by providing a chain of two or more fiber amplifiers and pumping the amplifiers at a predetermined wavelength to produce gain over a specified wavelength range. The amplifiers could be interspersed with transmission losses, splitting losses, or other system losses and include a distributed fiber amplifier. The type of fiber amplifiers used can vary, but includes erbium-doped fiber amplifiers (EDFAs) or any amplifiers which can be pumped either directly into the upper lasing transition or a higher lying state.

In order to test the effectiveness of the system of the proposed invention, an experiment mimicking the parameters of a long-haul transmission system was conducted. The fiber amplifiers used in this experiment were EDFAs constructed as shown in FIG. 1b using alumino-germano silicate erbium-doped fiber 3. The fiber length was chosen to provide high gain (corresponding to a large repeater spacing in a long-haul network or large splitting losses in a local network) and allow the amplifier to be operated with some gain compression even at relatively low input powers. Optical isolators were placed at the input and output of each amplifier to eliminate the effects of any spurious reflections on the performance of the amplifiers. All amplifiers in the chain 1 were co-pumped at around 980 nm. The first of the four amplifiers in the chain 1 was pumped with 65 mW from a Ti:sapphire laser. The remaining three amplifiers were pumped by laser diodes, with 70 mW from the diode pigtails being available to pump amplifiers two and three and 50 mW for the final amplifier. The signals 4 launched into the chain of amplifiers were provided by a DFB laser at 1554 nm (likely to be near the center channel of a DWDM system), and an erbium-doped fiber ring laser which was tunable from 1540 nm to 1562 nm, and, hence, covered the range of likely channels for DWDM networks.

Figure 2:
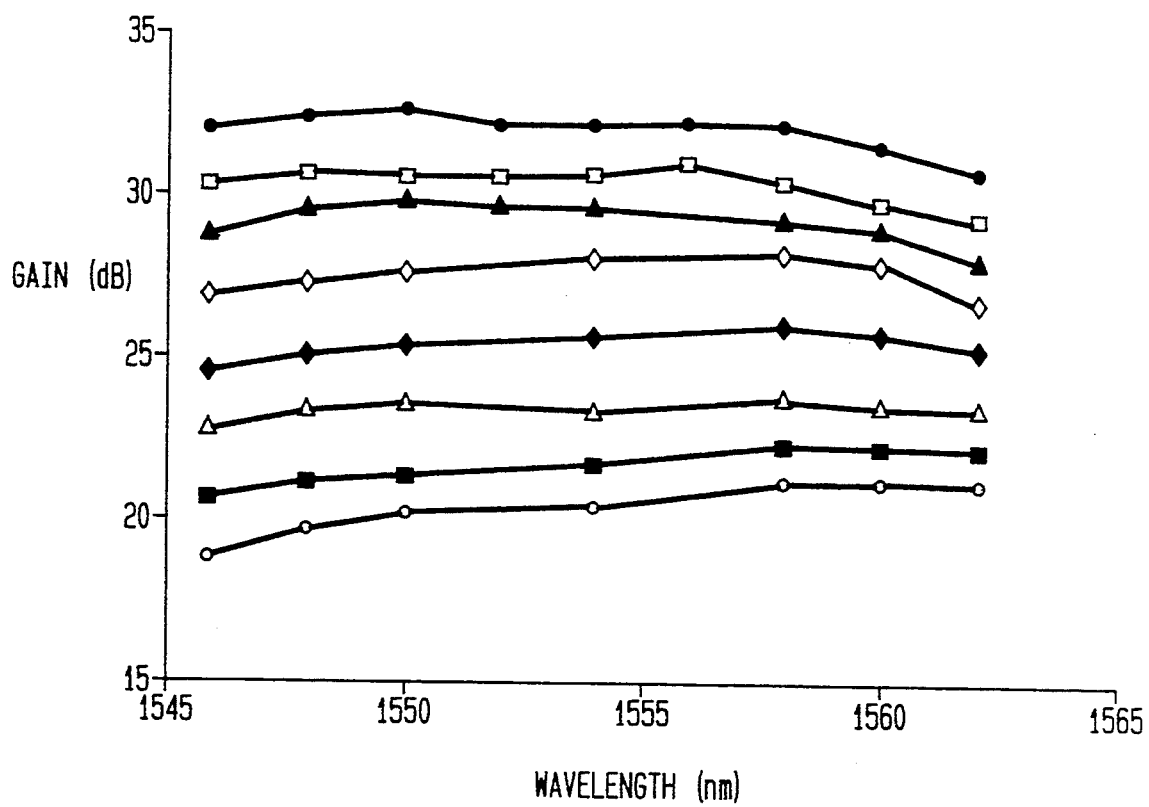
FIG. 2 shows the gain spectra for a single EDFA for varying degrees of gain compression.

Gain spectra for a single amplifier operated under varying degrees of compression are shown in FIG. 2.

The probe power from the tunable fiber laser was held constant at −27 dBm and the wavelength was tuned from 1546 to 1562 nm. The gain compression was varied by adjusting the power of the 1554 nm DFB laser. From FIG. 2, it can be seen that as the amplifier is driven deeper into saturation, the slope of the gain spectra increases. For a chain of amplifiers, such a gain slope will result in a narrow peak in the gain spectrum, both because of the concatenation of the individual gain spectra and because of the saturating effect of amplified spontaneous emission accumulated as it is added by each amplifier. For a 1480 nm pumped EDFA, the gain spectrum corresponding to zero saturation signal is similar to that for −13 dBm of power in the saturating signal in FIG. 2. Thus pumping at 980 nm mitigates gain peaking because the gain spectrum starts off flatter, and so more ASE must accumulate before severe non-uniformity of the gain spectrum occurs. The lower spontaneous emission factor of 980 nm-pumped EDFAs also helps to reduce the build-up of ASE.

Figure 1A:
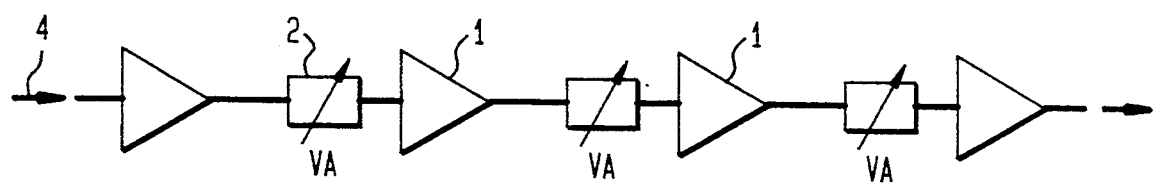
FIG. 1a shows the experimental set-up used for investigating the behavior of the four concatenated 980 nm-pumped EDFAs.
Figure 1B:
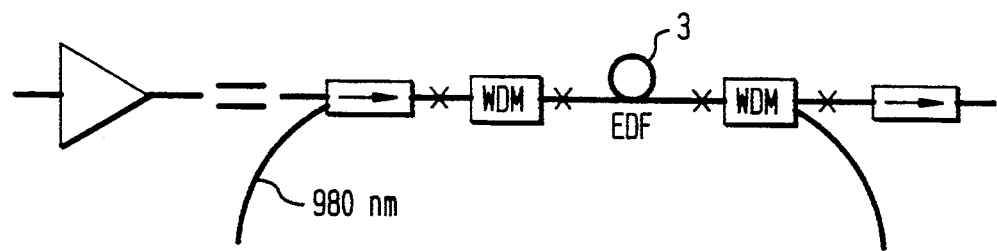
FIG. 1b shows the design of an individual EDFA.

A schematic diagram of the chain of concatenated amplifiers 1 is shown in FIG. 1a. Variable attenuators 2 were placed between successive pairs of amplifiers to represent fiber or splitting loss. The powers 4 launched into the first amplifier of the chain were −20 dBm at 1554 nm, together with −27 dBm from the tunable fiber laser source. The power of the 1554 nm DFB laser was set higher than that of the fiber laser to simulate the effect that five additional channels would produce. The attenuation of the variable attenuators was set so that −20 dBm at 1554 nm from the DFB was launched into each amplifier. The gain of the individual amplifier of FIG. 1b at 1554 nm with −20 dBm input was approximately 27 dB (from input connector to output connector), with around 5 dB gain compression and a noise figure of 5.5 dB and 6.0 dB being measured.

Figure 3:
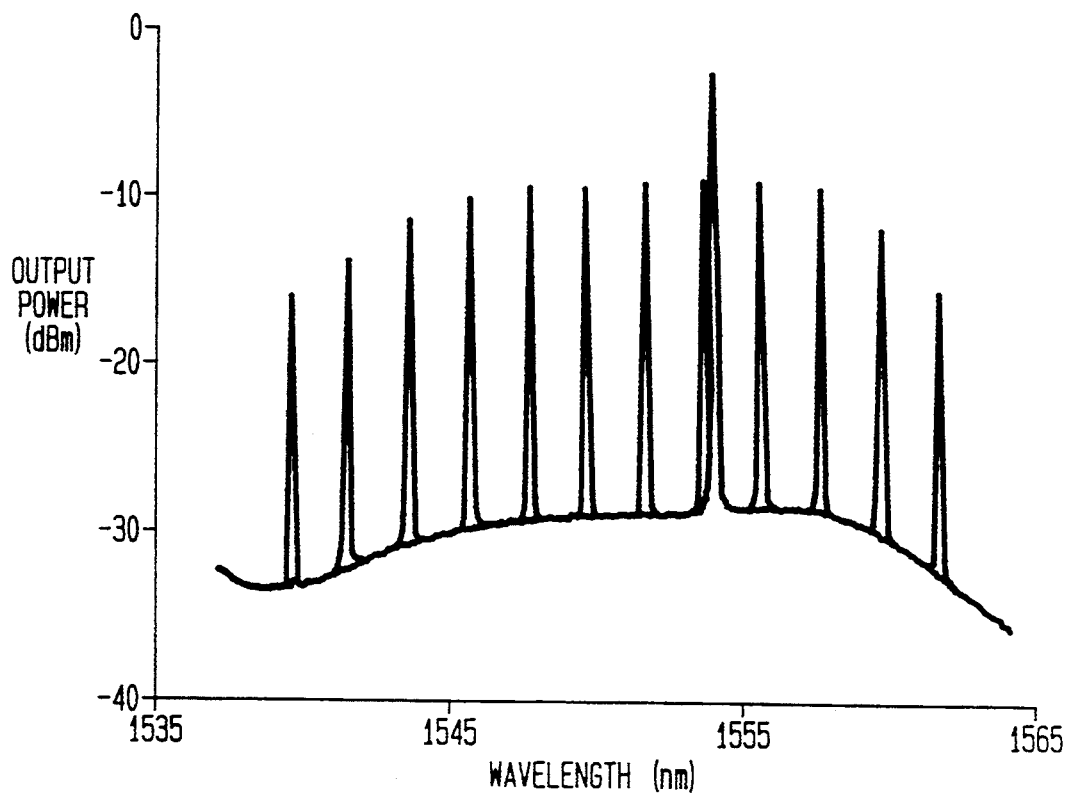
FIG. 3 shows the superposition of spectra taken at the output of the fourth amplifier in the chain.
Figure 4:
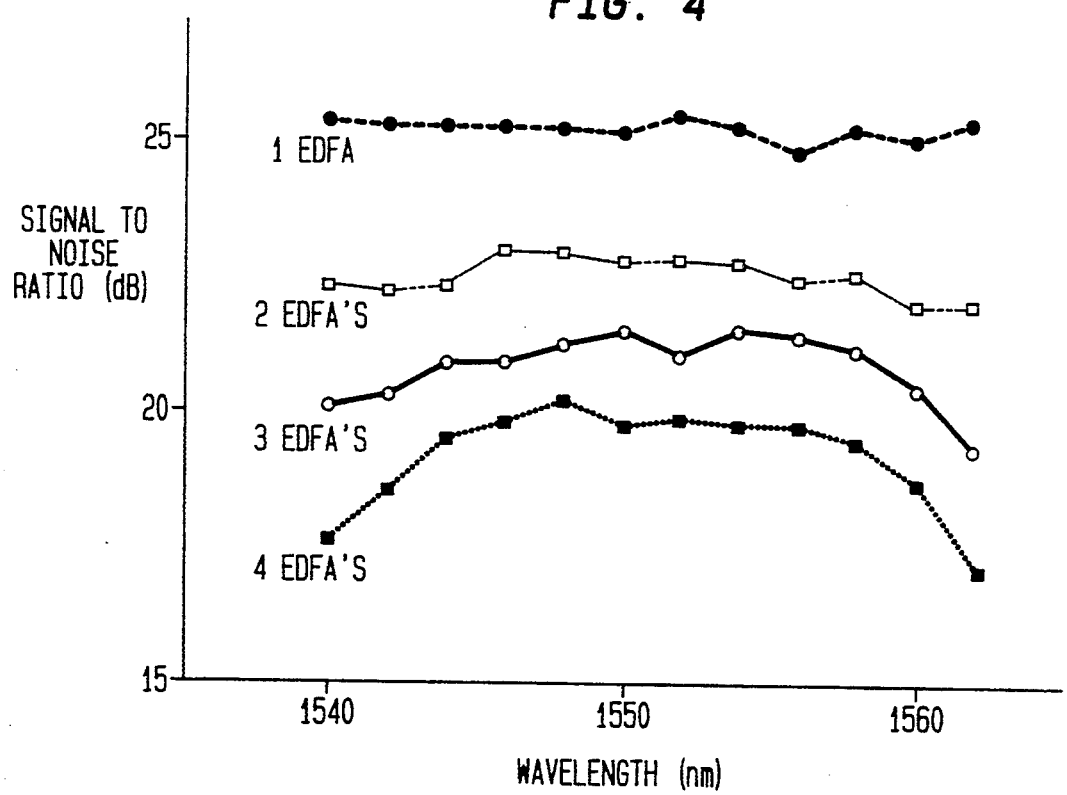
FIG. 4 shows variation of optical signal-to-noise ratio with signal wavelength after successive amplifiers.

The fiber laser wavelength was varied from 1540 nm to 1562 nm in two nm steps. For each fiber laser wavelength, spectra of the output of each amplifier were taken from which both the output power and the optical SNR, the ratio of the signal to ASE in a 0.1 nm bandwidth, were measured. FIG. 3 shows the superposition of all the spectra taken after the fourth amplifier in the chain. Each individual spectrum occupies 5 nm. FIG. 4 shows how the SNR varies as a function of signal wavelength after each amplifier in the chain. The SNR varies little with wavelength after one amplifier. However, after passing through four amplifiers there is a significant decrease in the SNR at the shortest and longest wavelengths compared to the center. However, the difference between the SNR at 1540 nm (the worst) and that at 1548 nm (the best) is less than 3 dB and this may prove to be acceptable for many systems. Furthermore, between 1544 nm and 1558 nm, the SNR varies by less than 1 dB even after four amplifiers; the contribution of each amplifier is less than 0.25 dB as would be expected from the results of FIG. 2. For longer chains, the penalty per amplifier should be similar.

Figure 5:
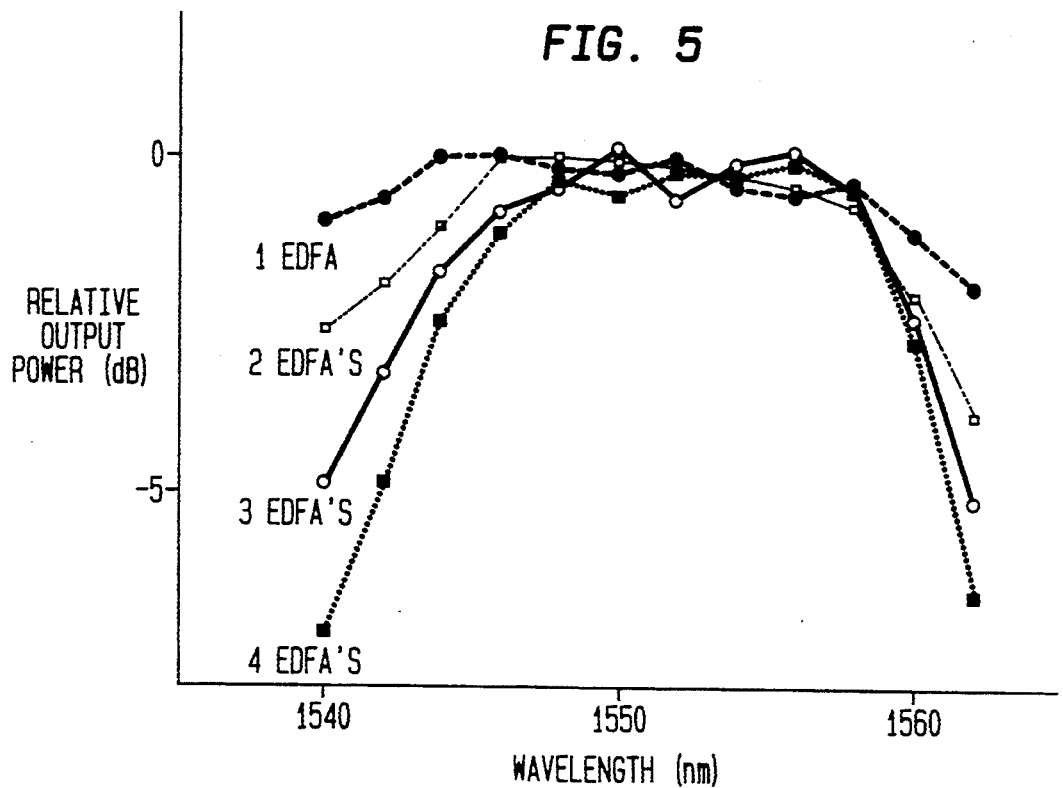
FIG. 5 shows the normalized output power of each amplifier as a function of signal wavelength, indicating the effect of gain peaking.

In addition to SNR, the variation in gain or output power of the chain of amplifiers with signal wavelength may also be of importance depending upon the dynamic range of the particular receiver used. FIG. 5 shows the output power of the amplified signal after each amplifier, normalized such that the output at the peak wavelength of each amplifier is set to 0 dB. Again, as expected, the difference between the extreme channels and the center channels increases on passing through each amplifier. However, the difference between the best and worst channel is only 7 dB, with less than 3 dB variation in output power being observed from 1544 nm to 1560 nm.

Thus, it is shown that the gain and optical SNR of a chain of four EDFAs pumped at 980 nm varies by only 7 dB and 3 dB respectively from 1540 nm and 1562 nm. In the 14 nm interval between 1544 nm and 1558 nm, the SNR varies by less than 1 dB and the output power by less than 3 dB. The maximum SNR penalty is less than 1 dB per EDFA in the chain even for the wider wavelength range.

These results suggest a similar success using the method of the present invention, whereby a chain of fiber amplifiers is interspersed within a communication system and pumped at a predetermined wavelength to produce gain over a specified wavelength range covering the range of likely channels for WDM systems. This range can vary depending on the type of fiber amplifier used. For example, in the present invention, the fiber amplifiers could be EDFAs pumped at a wavelength of not more than 1400 nm, or other fiber amplifiers pumped at a wavelength shorter than that corresponding to the wavelength of a transition between the ground state and the upper lasing level, the upper lasing level being the upper level for producing gain. In each of these cases, the specified wavelength range would be between approximately 1525 nm and approximately 1575 nm. However, this wavelength range could be as low as about 1300 nm for specific types of fiber amplifiers.

Obviously, numerous modifications and variations of the present invention are possible in view of the above teachings. It is therefore understood that within the scope of the appended claims, the invention may be practiced otherwise than as specifically described herein.

What is claimed is:

1. A method of mitigating gain peaking in a multi-channel optical communication system, comprising the steps of:
    (a) providing a chain of fiber amplifiers interspersed within a multi-channel optical communication system having a wavelength range of approximately 1525 nm to approximately 1575 nm; and
    (b) pumping the amplifiers at a wavelength of not more than 1400 nm to produce gain over the wavelength range of approximately 1525 nm to approximately 1575 nm. such that the transfer function and signal-to-noise ratio of each channel within the wavelength range is substantially equal.

2. The method of claim 1, wherein the amplifiers are erbium-doped fiber amplifiers ( EDFA ).

3. The method of claim 1, wherein said wavelength range is from approximately 1540 nm to approximately 1562 nm.

4. The method of claim 1, further comprising one or more optical isolators placed at either an input of each of said amplifiers, an output of each of said amplifiers or both said input and said output to eliminate the effects of any spurious reflections on the performance of said amplifiers.

5. A method of mitigating gain peaking in a multi-channel optical communication system, comprising the steps of:
    (a) providing a chain of erbium-doped fiber amplifiers (EDFA) interspersed within a multi-channel optical communication system; and (b) pumping the amplifiers at a wavelength of not more than 1400 nm to produce gain at the wavelength range of approximately 1525 nm to approximately 1575 nm, such that the transfer function and signal-to-noise ratio of each channel within the wavelength range is substantially equal.

6. The method of claim 5, wherein said wavelength range is from approximately 1540 nm to approximately 1562 nm.

7. A method of mitigating pain peaking in a communication system, comprising the steps of:
(a) providing a chain of fiber amplifiers interspersed within an optical communication system having at least two channels; and
(b) pumping the amplifiers at a predetermined wavelength to produce gain over a specified wavelength range;
(c) wherein predefined wavelengths in the specified wavelength range defines one of the at least two channels in the optical communication system, and wherein the gain and the signal-to-noise ratio of each channel is substantially equal.

8. The method of claim 7, wherein said specified wavelength range is approximately 1525 nm to approximately 1575 nm.

9. The method of claim 8, wherein said amplifiers are erbium-doped fiber amplifiers and said predetermined wavelength is less than or equal to 1400 nm.

10. The method of claim 7, wherein said predetermined wavelength is a wavelength shorter than that corresponding to a wavelength of a transition between a ground state and an upper lasing level.

11. The method of claim 7, wherein the amplifiers are pumped at a predetermined wavelength to produce a gain at a wavelength of approximately 1300 nm.

* * * * *